United States Patent
Heinonen, Jr.

[15] 3,677,629
[45] July 18, 1972

[54] INTERMITTENT FILM PRESSURE MECHANISM FOR CINEMATOGRAPHIC CAMERAS

[72] Inventor: Russell M. Heinonen, Jr., Hudson, Mass.
[73] Assignee: Technical Operations, Incorporated, Burlington, Mass.
[22] Filed: April 3, 1970
[21] Appl. No.: 25,474

[52] U.S. Cl. ...................................................352/225
[51] Int. Cl. ...............................................G03b 1/48
[58] Field of Search ..............................352/45, 225

[56] References Cited
UNITED STATES PATENTS
3,479,114   11/1969   Heinonen, Jr. ..................352/225

*Primary Examiner*—S. Clement Swisher
*Attorney*—Rosen & Steinhilper

[57] ABSTRACT

A cine camera has a color-encoding filter disposed on the optical axis with a rear surface thereof contiguous to the film exposure area. An intermittent pressure-applying means presses a film strip into firm engagement with the rear surface of the filter during each exposure interval. The pressure-applying means is driven away from the film by a film pull-down claw during each film advance interval.

5 Claims, 3 Drawing Figures

Patented July 18, 1972

3,677,629

INVENTOR
RUSSELL M. HEINONEN JR

BY,
*Rosen + Steinhilper*
ATTORNEYS 3,677,629

INTERMITTENT FILM PRESSURE MECHANISM FOR CINEMATOGRAPHIC CAMERAS

CROSS-REFERENCE TO RELATED APPLICATION

This application relates to, but is in no way dependent upon, an invention described and claimed in a copending application of mine, Ser. No. 25,404, filed Apr. 3, 1970, assigned to the assignee of the present invention.

BACKGROUND OF THE INVENTION

This invention is concerned, in general, with the problem of superimposing upon a primary image erected at the image plane of an optical system, a sharp auxiliary image of a light filter supported, as nearly as possible, in the primary image plane. Due to the effects of light scattering, the resolution of the auxiliary image is critically sensitive to any spacing of the filter from the system image plane. In a photographic camera application it is desirable to effect a firm and intimate engagement of the filter with the photosensitive film material during exposure. In cinematographic cameras of the intermittent film motion type it is necessary that the filter film contact pressure be applied intermittently in synchronism with the exposure intervals.

OBJECTS OF THE INVENTION

It is an object of this invention to provide apparatus in a cinematographic camera for intermittently pressing a film strip into firm engagement with a pressure-receiving surface during successive film exposure intervals.

It is another object to hold intermittently moved strip film material motionless and in intimate engagement with a surface of a color-encoding filter during exposure of the film.

It is a further object of my invention to provide apparatus capable of the above functions, and yet which is simple in construction and operation.

Other objects and advantages of this invention will in part be obvious and will in part become apparent as the following description proceeds. The features of novelty which characterize the invention will be pointed out with particularity in the claims annexed to and forming a part of this specification.

DESCRIPTION OF THE PREFERRED EMBODIMENTS

Figure 3:
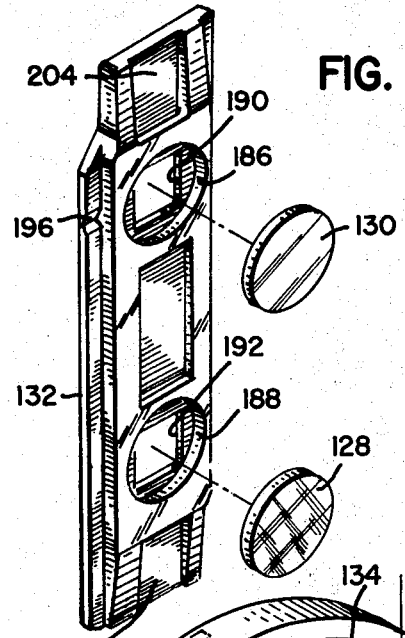
FIG. 3 is a perspective view of a holder for supporting a color-encoding filter at the film gate of the FIGS. 1-2.
Figure 2:
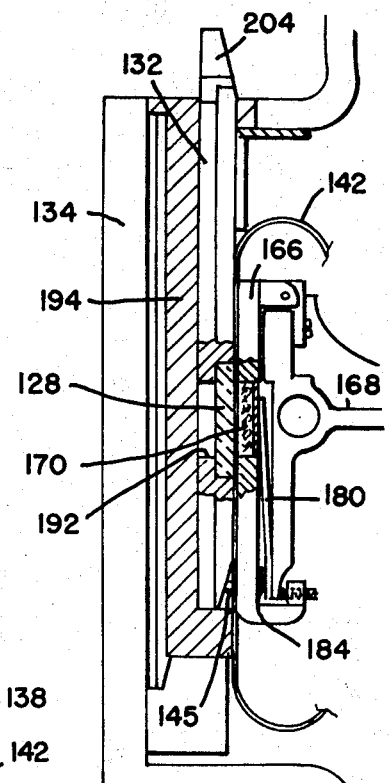
FIG. 2 is a fragmentary side elevation view of the FIG. 1 apparatus.
Figure 1:
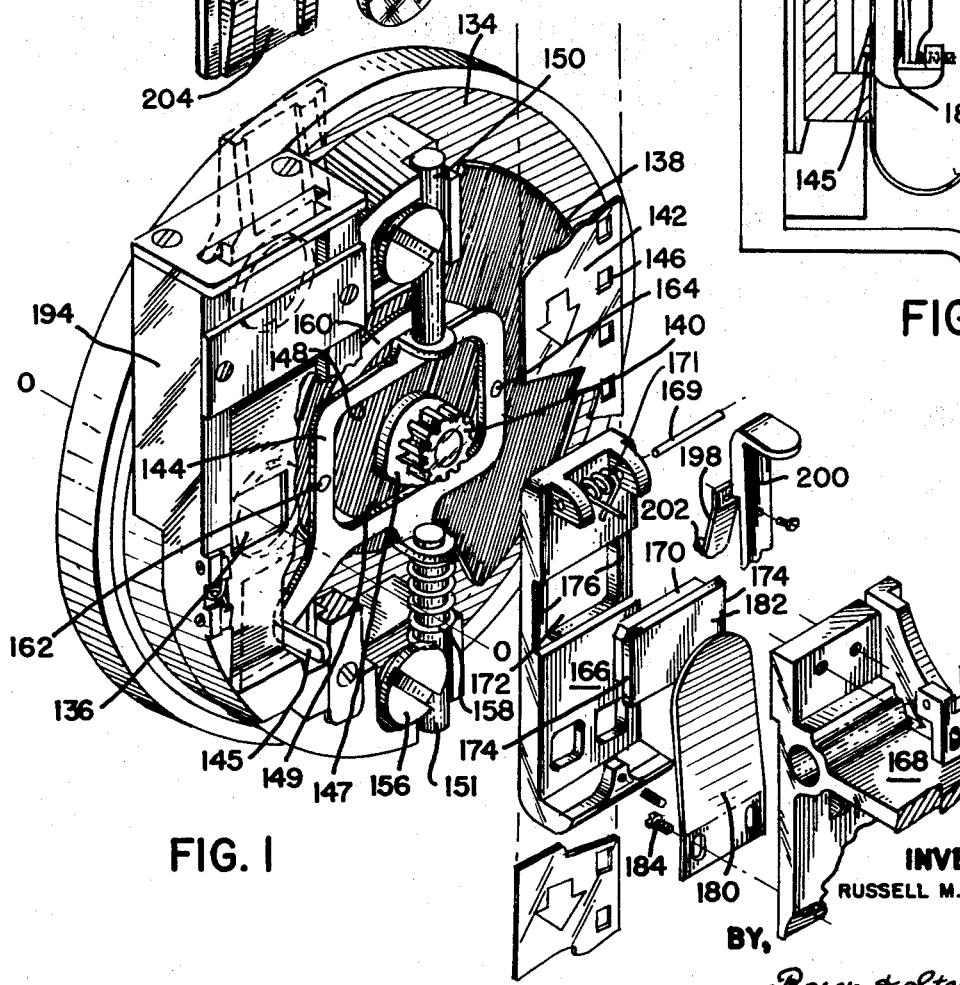
FIG. 1 is an exploded perspective view of a portion of a cine camera embodying apparatus constructed according to this invention.

FIGS. 1 and 2 show the concepts of my invention embodied in a commercially available camera of a well-known make. The camera is illustrated as comprising a front plate 134 defining an exposure opening 136 on the optical axis 0—0 of the camera objective lens (not shown) and supporting for rotating a shutter 138 driven through a spur gear 140 by drive means (not shown). A film advance mechanism for transporting a film strip 142 between supply and storage reels (not shown) is illustrated as including shuttle 144. The shuttle 144 contains a claw 145 which engages perforations 146 in the film strip 142 to effect an intermittent pull-down of the film strip 142. The shuttle 144 is reciprocated vertically by a radial cam 147 operating against cam follower surfaces 148, 149 on the shuttle. Shafts 150, 151 extending vertically from the top and bottom of the shuttle 144 are captured by screws 154, 156 and support the shuttle 144 for precise vertical motion. A spring 158 precludes shuttle chatter.

In order to introduce a reciprocatory axial movement in the claw 145, the shuttle 144 is caused to oscillate by the engagement of a double 180° face cam 160 on the shutter 138 operating against a pair of cam follower buttons 162, 164.

As suggested above, this invention concerns apparatus for intermittently pressing a film strip into engagement with the rear surface of a filter capable of encoding color information such that it can be recorded on black-and-white recording materials. In the disclosed embodiment such a color-encoding filter is shown at 128. It is extremely important when recording color information through the use of a color-encoding filter 128 to have the filter 128 and the film strip 142 in firm and intimate engagement during exposure. To this end, and in accordance with this invention, means are provided for pressing the film strip 142 into intimate engagement with the filter 128 during, but only during, film exposure intervals. This intermittent pressure-inducing means is illustrated as comprising a constant bias plate 166 for applying a slight but constant pressure against the film strip 142 as it passes through the film gate. The plate 166 is carried by a retractable arm 168 and is hinged to rotate about a pin 169. A torsion spring 171 applies a constant clockwise (in FIGS. 1 and 2) bias on the plate 166.

The constant bias plate 166 carries an insert 170 floating in an opening 172 therein. The insert 170 may be composed, for example, of stainless steel or chrome-plated aluminum. The insert 170 has shoulders 174 which abut the side walls 176 of the opening 172 to prevent the insert 170 from passing completely through the plate 166. The insert 170 and the plate 166 are dimensioned such that the forward operative surface of the insert 170 extends slightly beyond the forward surface of the plate 166, for example, 0.008–0.010 inch, when it is in its forwardmost position in the opening 172.

A leaf spring 180 exerts a firm bias against the back face 182 of the insert 170 when the arm 168 is in its forward operative setting. The spring 180 is attached to the arm 168 by a pair of screws, one of which is shown at 184.

The intermittent pressure mechanism operates as follows. At the start of the film pull-down stroke, the claw 145 on shuttle 144 is impelled rearwardly through a perforation 146 in the film strip 142 by the action of cam 160. The claw 145 engages the constant bias plate 166 and forces it away from the film strip 142. The claw 145 is thereafter driven downwardly by the cam 147 acting on the cam follower surface 149 of the shuttle 144. The insert 170, which is carried by the plate 166, is thus forced away from the film strip 142, relieving the pressure exerted thereon by the insert 170. At the end of the pull-down stroke claw 145 retracts from the engaged perforation, allowing the plate 166 to pivot forwardly and the insert 170, under the influence of leaf spring 180, to again reapply a firm pressure on the film strip 142. After exposure of the film strip 142, the cycle is repeated.

In accordance with the invention described and claimed in the above-identified copending application, there is provided a removable holder 132 mounting two light-affecting elements. One of the light-affecting elements is shown as being the color-encoding filter 128 and the other a neutral glass element 130 having the same optical retardation as the filter 128. The filter 128 may take the form of a neutral base supporting one or more colored grids of predetermined spectral absorption characteristic, spatial frequency, and azimuthal orientation.

Holder 132 is illustrated as being fabricated from metal stock and contains a pair of recesses 186, 188 arranged along the longitudinal axis of the holder 132. The recesses 186, 188 receive the filter 128 and neutral element 130. Rectangular openings 190, 192 in the bottom walls of the recesses 186, 188 act as field-defining apertures.

In order to guide the holder through the camera housing, a guide structure 194 is provided. The guide structure 194 defines a channel for receiving the holder 132.

The holder 132 contains a pair of notches, one of which is shown at 196, forming part of detent means for positioning and locking the holder 132 in an operative position in the camera. A mating male portion of the detent means comprises a spring arm 198 mounted on a bracket 200 and having a finger 202 which snaps into one or the other of notches 196 when the holder 132 is inserted into its operative position in the guide structure 194.

To convert between color-encoding black-and-white photography and conventional black-and-white photography, or to remove the filter 128 or element 130 for cleaning, the user grasps the protruding manually engageable tab 204 and withdraws the holder 132 from the camera. If it is desired to convert to the alternate mode of recording, the holder 132 is rotated about a normal thereto (end for end) and the opposite end is reinserted into the guide structure 194 until the spring arm 198 engages the appropriate notch 196 in the holder 132.

Thus, by this invention, means are provided in a cine camera for intermittently pressing a film strip into firm, intimate engagement with a color encoding filter or neutral element to render the camera capable of either conventional black-and-white photography or, alternatively, color-encoding black-and-white photography.

The invention is not limited to the particular details of construction of the embodiments depicted, and it is contemplated that various and other modifications and applications will occur to those skilled in the art. Therefore, because certain changes may be made in the above-described process without departing from the true spirit and scope of the invention herein involved, it is intended that the subject matter of the above depiction shall be interpreted as illustrative and not in a limiting sense.

What is claimed is:

1. In a cinematographic camera having an optical axis, the combination comprising:
   means for supporting a perforated strip of photosensitive film for exposure at an exposure area;
   a light-affecting element having a planar rear surface;
   means for supporting said element on said optical axis forwardly of said exposure area with said rear surface thereof disposed contiguous to said exposure area;
   film advance means including claw means and means for driving said claw means such that said claw means periodically penetrates and engages a film perforation and advances the film to a succeeding frame with a unidirectional pull-down motion; and
   an intermittent pressure mechanism, comprising:
      pressure-applying means carrying an insert having a surface disposed rearwardly of and contiguous to said exposure area for engagement with the film strip in said exposure area,
      means mounting said pressure-applying means for to-and-fro movement such that said engagement surface is capable of being brought into and out of engagement with a film strip transported through said exposure area,
      spring means for continuously urging said pressure-applying means toward the film strip, and
      cam follower means on said pressure-applying means and registered with said claw means so as to be engaged and driven by said claw means during said pull-down motion, said claw means driving said pressure-applying means carrying with it said insert away from the film strip to release during each film advance interval the pressure exerted on said film by said engagement surface of said insert.

2. The apparatus defined by claim 1 wherein said pressure-applying means carries said insert loosely, additional spring means being supported by said pressure-applying means for engaging and biasing said insert toward the film strip at all times, said insert having shoulder means engaging said pressure applying means, said pressure-applying means via said shoulder means carrying said insert away from a film strip when said claw means drives said pressure-applying means away from said film strip during each film pull-down motion.

3. In a cinematographic camera having an optical axis, the combination comprising:
   means for supporting a perforated strip of photosensitive film for exposure at an exposure area;
   a light-affecting filter having a planar rear surface;
   a removable holder for supporting said filter on said optical axis forwardly of said exposure area with said rear surface thereof disposed contiguous to said exposure area;
   means for guiding said holder from an inoperative position outside the camera to an operative position within the camera wherein said filter is disposed on said axis;
   film advance means including claw means and means for driving said claw means such that said claw means periodically penetrates and engages a film perforation and advances the film to a succeeding frame with a unidirectional pull-down motion; and
   an intermittent pressure mechanism, comprising:
      pressure-applying means having a surface disposed rearwardly of and contiguous to said exposure area,
      means pivotally mounting said pressure-applying means for oscillatory movement such that said surface thereof is capable of being brought into and out of engagement with a film strip transported through said exposure area,
      spring means for continuously urging said pressure-applying means toward the film strip, and
      cam follower means on said pressure-applying means and registered with said claw means so as to be engaged and driven rearwardly by said claw means during said pull-down motion, said claw means driving said pressure-applying means away from the film strip to release during each film advance interval the pressure exerted on said film by said pressure-applying means.

4. The apparatus defined by claim 3 wherein said pressure-applying means carries loosely an insert having a smooth forward surface adapted for engagement with the film strip, said spring means being supported by means independent of said pressure-applying means for engaging and biasing said insert toward the film strip at all times, said forward surface of said insert exerting pressure on the film strip during an exposure interval, said pressure-applying means having shoulder means for carrying said insert away from a film strip when said claw means drives said pressure-applying means away from said film strip during each film pull-down motion.

5. The apparatus defined by claim 4 wherein said light-affecting filter comprises an amplitude grating.

* * * * *